United States Patent [19]
Inagami et al.

[11] 3,800,052
[45] Mar. 26, 1974

[54] PREPARATION OF AN ACIDIFIED MILK BEVERAGE

[75] Inventors: Kaoru Inagami; Hidemoto Kamada, both of Tokyo; Kazuo Ino, Zama; Takeshi Terabayashi, Tokyo; Hiroki Iio, Yamato; Hirosi Yamamura, Tokyo, all of Japan

[73] Assignee: Calpis Shokuhin Kogyo Kabushiki Kaisha, Tokyo, Japan

[22] Filed: Nov. 22, 1971

[21] Appl. No.: 200,832

[30] Foreign Application Priority Data
Nov. 26, 1970 Japan.............................. 45-103694
Dec. 17, 1970 Japan.............................. 45-112854

[52] U.S. Cl.................. 426/359, 426/185, 426/356
[51] Int. Cl............................................. A23c 23/00
[58] Field of Search................................. 99/54, 59

[56] References Cited
UNITED STATES PATENTS
3,378,375  4/1968  Little ....................... 99/59
3,432,306  3/1969  Edwards ................. 99/54
3,359,116  12/1967  Little ....................... 99/54
2,818,342  12/1957  Ransom ................. 99/54 X
3,174,865  3/1965  Johnston et al ......... 99/54

Primary Examiner—David M. Naff
Attorney, Agent, or Firm—Stevens, Davis, Miller & Mosher

[57] ABSTRACT

A sour milk beverage having good whiteness and stability is made by adding acid to skim milk to bring the pH within the range 3.50 to 3.70. The skim milk is used in a quantity such that the finished product contains 0.6 to 2.5 percent of solids-not-fat content. The acid may be added to bring the beverage to a pH of 3.70 to 3.80 provided that sugar is added first to the skim milk so that the sugar is at least 15 percent of the combined weight of skim milk and sugar. At this pH the drink may contain 0.6 to 3.0 percent of solids-not-fat content. The addition of sugar before acidification is also applicable to the beverage with pH of 3.50 to 3.70 and increases the stability.

6 Claims, No Drawings

PREPARATION OF AN ACIDIFIED MILK BEVERAGE

BACKGROUND OF THE INVENTION

This invention is concerned with a method of producing a sour milk beverage which has a white turbidity resulting from using of milk and is stable against sedimentation of suspended materials over a long period.

To prevent the nutritive components of milk from denaturation and to obtain a delicious milk beverage by making the most of the flavor of milk, it has heretofore been customary to derive a milk beverage from milk either by acid fermentation or by addition of an acid.

However when the aforesaid fermented milk beverage or acid-added milk beverage is prepared to a suitable acidity for drinking, the milk protein tends to precipitate during storage in the ready-to-drink form. Dairy engineers have, therefore, developed various methods of producing a sour milk beverage with a high stability. The methods hitherto put into practice include:

1. A method wherein the curd produced by acidifying the milk is finely homogenized.
2. A method wherein the milk beverage is adjusted to and maintained at a high degree of acidity, i.e., at a pH value below 3.5.

These methods have not proved to be completely satisfactory. In the first case, a desired white turbidity can be obtained temporarily by means of a homogenizer. When the homogenized beverage is allowed to stand for several days, however, the physically crashed milk potein particles recoagulate and settle at the bottom. In the second case, since the pH value of below 3.5 is far lower than the isoelectric point of casein, the milk protein particles in a sour milk beverage of such an acidity are dissolved so as to confer stability upon the milk beverage. In this state, the beverage becomes opaque like soapy water and assumes a undesirable color tone for a sour milk beverage. It is conceivable that the amount of milk protein may be increased to improve the white turbidity at a pH value below 3.5. However, the beverage still has a color tone resembling that of soapy water in spite of the increase of an amount of milk protein.

SUMMARY OF THE INVENTION

It is an object of this invention to provide a method of producing a sour milk beverage which will retain the white turbidity appropriate to a milk beverage over a long period, with milk protein particles suspended stably at a concentration suitable for drinking, namely, in a ready-to-drink state. It is a further object to provide such a beverage in which neither addition of a large amount of sugar nor use of any additives such as a dispersing agent is required to effect a stable suspension of milk protein particles.

DETAILED DESCRIPTION OF THE INVENTION

The white turbidity can be rated by visual inspection or indicated by a value to be determined with various measuring instruments. The desirable turbidity of the milk beverage of this invention is at least 35 as L value of lightness to be determined by the color-difference meter. "Color-difference meter" is an instrument for determining the color tone and the shade of color of a given substance in a numerical value. The white turbidity is indicated in terms of intensity of reflected light. The degree of whiteness increases as the value of lightness gets larger. In the case of a milk beverage, the whiteness is due to the suspended milk protein particles and, therefore, is referred to herein as "white turbidity" and not as "whiteness". It has been found from our research that the L value is correlated more closely with the visual whiteness than is the turbidity given in terms of the optical density. Thus, it has been decided to use the L value for indicating the white turbidity.

The present invention to produce the aforesaid sour milk beverage has been accomplished, on the basis of the information gathered in the detailed studies concerning such factors as pH value, solids-not-fat content, sugar concentration and so forth.

As the first step, the state (behavior) of milk protein in various milk solutions with low pH values below the isoelectric point of casein was carefully examined. As a result, it has been found that the coagulated milk protein begins to separate into fine particles around pH 3.8 and that below pH 3.7 it is thoroughly broken to form stably suspended milk protein particles. When such a solution is heated at or over 60°C, its suspension stability can be improved. In the range of from pH 3.70 to pH 3.50, the milk protein is stably suspended and a desirable white turbidity is maintained. When the pH value falls below 3.50, the white turbidity lowers abruptly and the milk solution assumes an opaque color tone resembling that of soapy water, because milk protein is dissolved or forms a hydrophilic colloid. This is logically explained by postulating that milk protein particles, in the range of from pH 3.70 to pH 3.50, have a positive electron charge and thus repel each other and yet form a micelle union because of remaining active anionic group. It is further inferred that, at a pH value below 3.50, the micelle union is destroyed and the color tone like that of soapy water increases because the anionic group is deactivated and the positive electron charge increases.

Based on the aforesaid knowledge aquired as to the behavior of milk protein, researches were carried out in further details. It has been discovered that, in the range of from pH 3.50 to pH 3.70, the suspension of milk protein particles can be stabilized without any special heat treatment if the amount of skim milk to be used is regulated within the range of from 0.6 to 2.5 percent as solids-not-fat content, and that a sour milk beverage having much stabler white turbidity can be obtained by giving a heat treatment of 60°C × 20 min. or a stronger heating. It has additionally been found that, in the range of from pH 3.70 to pH 3.80, the suspension of milk protein particles is stabilized so as to produce a sour milk beverage with a desirable degree of white turbidity, if sugar is added prior to the addition of an acid to the milk. In the range of from pH 3.70 to pH 3.80, it is necessary that the solids-not-fat content in the finished product should fall in the range of from 0.6 to 3.0 percent and the amount of sugar to be added in advance should exceed 15 percent (percentage determined in the mixture of skim milk and sugar). The method of adding sugar prior to acidification is, of course, applicable to the manufacture of beverage with a pH value of from 3.50 to 3.70. This method provides a much stabler beverage than the method in which the addition of sugar does not precede the acidification.

Namely, a very stable beverage with from 0.6 to 3.0 percent solids-not-fat content derived from skim milk and with a pH value of from 3.50 to 3.80 can be produced by using the method of adding sugar prior to acidification, to the skim milk so that the amount of sugar is at least 15 percent of the combined weight of sugar and skim milk.

In the above mentioned manner of adding an acid to skim milk during the process for a sour milk beverage, the amount of skim milk is regulated so as to fall in the range of from 0.6 to 2.5 percent as solids-not-fat content when the product is desired to have a pH value within the range of from 3.50 to 3.70. If the pH value of the product is desired to range from 3.70 to 3.80, the amount of sugar to be added in advance to skim milk is kept above 15 percent (percentage determined in the mixture of skim milk and sugar) and the amount of skim milk is regulated to fall in the range of from 0.6 to 3.0 percent as solids-not-fat content. The sour milk beverage thus manufactured retains stably their white turbidity over 35 L value.

The term "skim milk" used herein refers to ordinary skim milk obtained by skimming fresh milk, condensed skim milk, and reconstituted skim milk. The fresh skim milk condensed skim milk or reconstituted skim milk may be used with or without being diluted with water. The acids which can be used for this invention include for example, lactic acid, citric acid, tartaric acid, malic acid, gluconic acid, phosphoric acid, acidic amino acid and so on.

To obtain a highly stable sour milk beverage, sugar is added to the skim milk prior to the addition of such acids. The sugars which can be used for this purpose include for example, monosaccharides such as glucose, galactose, and fructose, disaccharides such as sucrose, maltose, and lactose and polyhydric alcohols such as sorbitol. Those sugars which have four or more hydroxyl groups and have no acidic group and which are easily soluble in water are usable for this invention.

The various skim milks mentioned above may be used alone or in the form of a mixture of two or more kinds. This applies also to the various acids and the various sugars enumerated above.

In manufacturing a sour milk beverage of good quality in accordance with this invention, it is effective to add some flavors for enhacing the taste, to use a pH-regulating substance for adjusting the pH value, or to add a sulfate for improving the white turbidity. It is naturally permissible to incorporate milk protein for the purpose of increasing the white turbidity of the product. And from our detailed research, it has been also found that a sulfate is very effective to increase the white turbidity in the pH range below 3.50.

Typical experiments are cited hereinafter for a specific illustration of the present invention.

Experiment 1 aimed to clarify the basic interrelationship between pH value, white turbidity, and precipitation during the manufacture of a sour milk beverage without adding any sugar to the skim milk prior to the addition of acid.

EXPERIMENT 1

One hundred (100) g of fresh skim milk was mixed with water to 400 g and the mixture was divided into 40 g aliquots. The aliquots were adjusted to various pH values, ranging from pH 3.30 to pH 4.00, by adding 20 percent aqueous solution of lactic acid or 20% aqueous solution of phosphoric acid. Each of them was increased to 100 g by adding 10 g of sugar and the balance of water. The solutions were heated to 80°C, cooled to 20°C, and then allowed to stand in a room at 20°C for one month. At the end of this standing, they were tested for pH value and the white turbidity (L from The degree of precipitation was rated by visual observation. The drinks thus obtained were found to have a solids-not-fat content of 0.8 percent.

From Table 1, it is clear that the beverages having pH values from 3.30 to 3.40 had such low degrees of white turbidity that they were opaque and assumed a color tone similar to that of soapy water, though there took place no precipitation of the milk protein. By contrast, the beverages having pH values above 3.50 showed an increased white turbidity approximating to the whiteness of milk. The beverages having pH values higher than 3.80 were transparent because the major part of the milk protein had precipitated.

TABLE 1

Relationship Between pH, White Turbidity, and Precipitation

| Acid | pH | Immediately after manufacture | | After one month's standing at 20°C | |
|---|---|---|---|---|---|
| | | White turbidity (L value) | Precipitation | White turbidity (L value) | Precipitation |
| | 3.30 | 21.4 | – | 21.2 | – |
| | 3.40 | 27.0 | – | 27.3 | – |
| | 3.50 | 35.8 | – | 36.1 | – |
| Lactic | 3.60 | 47.1 | – | 46.5 | – |
| acid | 3.70 | 50.4 | – | 49.5 | – |
| | 3.80 | * | +++ | * | +++ |
| | 3.90 | * | +++ | * | +++ |
| | 4.00 | * | +++ | * | +++ |
| | 3.30 | 21.8 | – | 21.1 | – |
| | 3.40 | 25.2 | – | 26.1 | – |
| | 3.50 | 34.7 | – | 34.5 | – |
| Phosphoric | 3.60 | 44.2 | – | 44.7 | – |
| acid | 3.70 | 49.1 | – | 49.0 | – |
| | 3.80 | * | +++ | * | +++ |
| | 3.90 | * | +++ | * | +++ |
| | 4.00 | * | +++ | * | +++ |

Remarks: The rating was made on the scale, wherein:
+++ denotes heavy precipitation
++ denotes a slight degree of precipitation
+ denotes discernible precipitation
– denotes absence of precipitation
* denotes omission of measurement because of formation of too much precipitation Experiment 2 aimed to clarify the interrelationship between pH value, solids-not-fat content of skim milk, the white turbidity (L value), and the precipitation.

EXPERIMENT 2

Various solutions were prepared from fresh skim milk so that the finished products might have different solids-not-fat contents. Each of them was divided into three aliquots and adjusted to pH 3.50, pH 3.60 and pH 3.70 by adding lactic acid. Sucrose was added to each of these solutions so that the sucrose concentration of the finished products might be 10 percent. The resultant solutions were subjected to the same heat treatment as in Experiment 1 and thereafter allowed to stand at 20°C for one month. At the end of this standing, they were tested for pH value, the white turbidity (L value), and the precipitation. The results are given in Table 2. The data indicate that the concentration of skim milk (solids-not-fat content) and the stability of suspension of the milk protein varied with pH value in the range of from 3.50 to 3.70.

TABLE 2.—INTERRELATIONSHIP BETWEEN BETWEEN SOLIDS-NOT-FAT CONTENT, pH, WHITE TURBIDITY, AND PRECIPITATION

| Solids-not-fat content (percent) | pH 3.50 White turbidity (L value) | pH 3.50 Precipitation | pH 3.60 White turbidity (L value) | pH 3.60 Precipitation | pH 3.70 White turbidity (L value) | pH 3.70 Precipitation |
|---|---|---|---|---|---|---|
| 3.0 | * | +++ | * | +++ | * | +++ |
| 2.5 | 55.6 | — | * | +++ | * | +++ |
| 2.0 | 50.7 | — | * | +++ | * | +++ |
| 1.8 | 50.1 | — | 57.1 | — | * | +++ |
| 1.6 | 48.2 | — | 55.4 | — | 56.8 | — |
| 1.4 | 46.3 | — | 53.6 | — | 57.5 | — |
| 1.2 | 43.5 | — | 51.5 | — | 55.2 | — |
| 1.0 | 40.7 | — | 49.0 | — | 53.0 | — |
| 0.8 | 35.6 | — | 47.5 | — | 49.5 | — |
| 0.6 | 30.0 | — | 39.7 | — | 44.4 | — |
| 0.4 | 25.2 | — | 26.8 | — | 29.7 | — |

Remarks. The rating was made on the scale, wherein:
+++ denotes heavy precipitation.
++ denotes a slight degree of precipitation.
+ denotes discernible precipitation.
− denotes absence of precipitation.
* denotes omission of measurement because of too much precipitation.

Experiment 3 was performed to examine the effect to be brought about by adding sugar to the skim milk prior to the addition of an acid in manufacturing a sour milk beverage.

EXPERIMENT 3

To 20 g portions of skim milk, sucrose was added in such amounts as required for the sucrose contents to be 5, 10, 15, 20, 25, 30, and 50 percent (percentage determined in the mixtures of skim milk and sugar). A portion containing no sucrose was also prepared as a control. The portions were heated to 80°C to cause a dissolution of sucrose quickly, cooled to 20°C, and thereafter adjusted to pH 3.50 by adding thereto 20 percent aqueous solution of lactic acid. Then, certain amount of sucrose was added to these portions so that the final sucrose content (concentration) might be 10 percent. They were diluted with water to 200 g, while the pH value was adjusted to 3.50. The resultant solutions were sterilized at 80°C for 20 minutes and packaged in containers. The packaged products were allowed to stand in a room at 20°C, in order to observe the degree of precipitation. The results are shown in Table 3.

TABLE 3.—RELATIONSHIP BETWEEN THE AMOUNT OF SUGAR ADDED AND PRECIPITATION

| Sugar concentration (percent) | After 1 month | After 2 months | After 3 months | After 4 months | After 5 months | After 6 months |
|---|---|---|---|---|---|---|
| 0 | — | — | — | ± | + | + |
| 5 | — | — | — | ± | + | + |
| 10 | — | — | — | ± | + | + |
| 15 | — | — | — | — | ± | + |
| 20 | — | — | — | — | — | ± |
| 25 | — | — | — | — | — | — |
| 30 | — | — | — | — | — | — |
| 50 | — | — | — | — | — | — |

Remarks: The rating was made on the scale, wherein:
+ denotes heavy precipitation.
± denotes a slight degree of precipitation.
− denotes absence of precipitation.

The results of Table 3 indicate that the addition of sugar was slightly effective as long as the amount of sugar was below 15 percent and that the addition of sugar to the extent over 15 percent, preferably over 25 percent was needed to accomplish the object of this invention.

The upper limit to the amount of sugar thus added may be suitably fixed by taking into account such factors as the production efficiency and the desirable sweetness and flavor of the final products.

The present invention will be understood in more detail by referring to the following examples.

EXAMPLE 1

To 1.2 kg of skim milk was added 7.703 kg of water. Then, it was mixed with 0.077 kg of 20 percent aqueous solution of lactic acid and 0.02 kg of 20 percent aqueous solution of citric acid and agitated thoroughly. The resultant solution was diluted to 10 kg by adding 1.0 kg of sugar and the balance of water. Consequently, the solution had a pH value in the range of 3.6 to 3.7. After the adjustment of the pH value of the solution accurately to 3.63 with the aqueous solution of lactic acid or sodium carbonate, it was heated at 70°C for 30 minutes and cooled. Thereafter, it was refined by centrifugal separation at 150G for 10 min. and, after the addition of a flavor, packaged in bottles. The bottled beverage was sterilized at 90°C for 5 minutes and then stored in a room at 20°C for three months. At the end of this standing, it was found that the beverage was still retained a desirable white turbidity. Virtually no precipitation was observed. In addition no propagation of microorganisms was noticed.

EXAMPLE 2

One hundred (100) g of skim milk and 100 g of sucrose were mixed and heated to 80°C so as to dissolve sucrose quickly. Then, the solution was cooled down to about 20°C. The pH value of this solution was adjusted to 3.52 with 10 percent aqueous solution of citric acid added as quickly as possible, with agitation of the solution. Then, it was diluted with water to 1000 g and was readjusted to pH 3.52. After an addition of a flavor, the solution was carbonated so that the carbonic acid gas pressure of the final product might be 1.0 kg/cm$^2$. Further, it was pasteulized at 60°C for 30 minutes, and then there was obtained a sour milk beverage containing carbonic acid gas.

EXAMPLE 3

15 g of skim milk was mixed with 85 g of water. To the resultant solution were added 90 g of sucrose and 10 g of glucose. This mixture was heated to 80°C so as to dissolve sugar quickly and then cooled down to 20°C. The pH value of this solution was adjusted to 3.75 with 20 percent aqueous solution of lactic acid added as quickly as possible with agitation. It was then diluted with water to 1000 g. Again, the pH value of the solution was adjusted accurately to 3.75. After an addition of a small amount of flavor, the solution was sterilized at 90°C for 5 minutes to produce a sour milk beverage.

What is claimed is:

1. A method of manufacturing an acidified milk beverage consisting essentially of
   a. providing skim milk having a skim milk non-fat solids content adequate to range from 0.6 to 3.0 percent by weight in said beverage, b. adding sugar to said skim milk in an amount of at least 15 percent of the combined weight of sugar and skim milk before adding acid, and c. adding acid to the sugar skim milk mixture to bring the pH to within the range of 3.50 to 3.80.

2. The method of claim 1, in which when the final pH is from 3.70 to 3.80 and the non-fat solids content of the skim milk is from 0.6 to 3.0 percent by weight of the final product, the amount of sugar added in step (b) is at least 25 percent of the combined weight of sugar and skim milk.

3. The method of claim 1, in which the sugar is at least one sugar selected from the group consisting of liquid and solid sugars having four or more hydroxyl groups and no acid groups.

4. The method of claim 1, in which the skim milk is at least one member selected from the group consisting of fresh skim milk, condensed skim milk and reconstituted skim milk.

5. The method of claim 1, in which the acid is at least one acid selected from the group consisting of lactic acid, citric acid, tartaric acid, malic acid, gluconic acid, and phosphoric acid.

6. The method of claim 1 futher consisting essentially of carrying out a heat treatment at least at 60°C for 20 minutes to stabilize the suspension of milk protein particles.

* * * * *